(12) United States Patent
Kitora et al.

(10) Patent No.: US 11,390,412 B2
(45) Date of Patent: Jul. 19, 2022

(54) LAMINATED CONTAINER

(71) Applicant: YOSHINO KOGYOSHO CO., LTD., Tokyo (JP)

(72) Inventors: Shuichi Kitora, Tokyo (JP); Tatsuya Kawami, Tokyo (JP); Atsuhiko Yamazaki, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 225 days.

(21) Appl. No.: 16/756,076

(22) PCT Filed: Sep. 11, 2018

(86) PCT No.: PCT/JP2018/033687
§ 371 (c)(1),
(2) Date: Apr. 14, 2020

(87) PCT Pub. No.: WO2019/082534
PCT Pub. Date: May 2, 2019

(65) Prior Publication Data
US 2020/0239175 A1   Jul. 30, 2020

(30) Foreign Application Priority Data
Oct. 27, 2017 (JP) .............................. JP2017-208555

(51) Int. Cl.
*B65D 1/02* (2006.01)
*B29C 49/04* (2006.01)
(Continued)

(52) U.S. Cl.
CPC ......... *B65D 1/0215* (2013.01); *B65D 1/0223* (2013.01); *B29B 2911/1408* (2013.01);
(Continued)

(58) Field of Classification Search
CPC .. B65D 1/0215; B65D 1/0207; B65D 1/0261; B65D 1/0223; B65D 79/0084;
(Continued)

(56) References Cited

U.S. PATENT DOCUMENTS 4,989,738 A * 2/1991 Thayer .................... B29C 49/22
215/373
5,799,809 A * 9/1998 Sako ........................ B29C 49/42
215/12.1
(Continued)

FOREIGN PATENT DOCUMENTS

CN          1509944 A      7/2004
CN        102470950 A      5/2012
(Continued)

OTHER PUBLICATIONS

Apr. 28, 2020 International Preliminary Report on Patentability issued in International Patent Application No. PCT/JP2018/033687.
(Continued)

*Primary Examiner* — Robert J Hicks
(74) *Attorney, Agent, or Firm* — Oliff PLC

(57) ABSTRACT

A synthetic resin laminated container formed by extrusion blow molding into a bottle shape having a plurality of layers and including a mouth, a body and a bottom, wherein: the bottom has a grounding portion, a bottom wall portion provided inside the grounding portion and recessed inward the container with respect to the grounding portion, and a pinch-off portion having a protrusion thread shape protruding from a bottom surface that faces downward the bottom wall portion and both ends thereof in a longitudinal direction each is continuous to the grounding portion; the bottom surface is a flat surface; and an innermost layer is a polyester resin layer.

8 Claims, 3 Drawing Sheets

(51) Int. Cl.
*B29C 49/22* (2006.01)
*B29L 31/00* (2006.01)
(52) U.S. Cl.
CPC ............... *B29B 2911/14053* (2013.01); *B29B 2911/14093* (2013.01); *B29C 49/04* (2013.01); *B29C 49/22* (2013.01); *B29L 2031/7158* (2013.01)
(58) Field of Classification Search
CPC .. B65D 79/0081; B65D 79/008; B65D 11/20; B65D 23/12; A47G 19/23
USPC ...... 215/371, 381, 376, 12.2, 12.1; 220/626, 220/609, 608, 604; 428/36.91, 36.9, 35.7
See application file for complete search history.

(56) References Cited

U.S. PATENT DOCUMENTS

| | | | |
|---|---|---|---|
| 2017/0036802 A1 | | 2/2017 | Taruno |
| 2018/0016085 A1* | | 1/2018 | Kitora ................... B65D 1/0276 |

FOREIGN PATENT DOCUMENTS

| | | | | |
|---|---|---|---|---|
| GB | 2211165 A | * | 6/1989 | ............. B29C 49/22 |
| JP | H06-035132 U | | 5/1994 | |
| JP | 2004-059077 A | | 2/2004 | |
| JP | 2011-178423 A | | 9/2011 | |
| JP | 2011-213370 A | | 10/2011 | |
| JP | 2012-116519 A | | 6/2012 | |
| JP | 2015-016871 A | | 1/2015 | |
| WO | WO-2012000491 A2 | * | 1/2012 | ............. B29C 48/09 |

OTHER PUBLICATIONS

Feb. 2, 2021 Office Action issued in Chinese Patent Application No. 201880067353.X.
Nov. 20, 2018 International Search Report issued in International Patent Application No. PCT/JP2018/033687.
Aug. 26, 2021 Office Action issued in Chinese Patent Application No. 201880067353.X.
Apr. 20, 2021 Office Action issued in Japanese Patent Application No. 2017-208555.
May 27, 2021 Office Action issued in Canadian Patent Application No. 3,079,504.
Jan. 10, 2022 Office Action issued in Chinese Patent Application No. 201880067353.X.
Dec. 23, 2021 Office Action issued in Canadian Patent Application No. 3,079,504.

* cited by examiner

LAMINATED CONTAINER

TECHNICAL FIELD

The present disclosure relates to a synthetic resin laminated container formed by extrusion blow molding into a bottle shape having a plurality of layers and including a mouth, a body and a bottom.

BACKGROUND

As containers used to contain alcohol beverages such as refined sake and soft drinks as contents, synthetic resin laminated containers have been widely used, the laminated containers being formed by extrusion blow molding a laminated parison into a bottle shape having a laminated structure formed by laminating a plurality of layers and including a mouth, a body and a bottom (see Patent Literature (PTL) 1, for example).

CITATION LIST

Patent Literature

PTL 1: JP2011213370A

SUMMARY

Technical Problem

When a container is formed by the extrusion blow molding, a laminated parison is pinched off by a split mold and a pinch-off portion is formed at the bottom, and it is essential to ensure the fusing strength of the pinch-off portion.

On the other hand, when the above described laminated container is used to contain alcohol beverages such as refined sake, it is possible that an innermost layer of the container is formed of a polyester resin that is hard to absorb alcohol, rather than an olefin-based resin.

However, in the case where an innermost layer of the laminated container is a polyester resin layer, fusion between pinched-off sections is fusion between the polyester resins, and it is difficult to fuse these sections to each other. Thus it is difficult to secure fusing strength of the pinch-off portion, and when an impact caused by dropping is applied to the pinch-off portion, a fused portion of the pinch-off portion may be cracked.

The present disclosure has been conceived in view of the above problem, and is to provide a laminated container capable of preventing a fused portion of a pinch-off portion from being cracked by an impact caused by dropping and the like even if the innermost layer is a polyester resin layer.

Solution to Problem

A laminated container according to the present disclosure is a synthetic resin laminated container formed by extrusion blow molding into a bottle shape having a plurality of layers and including a mouth, a body and a bottom, in which: the bottom has a grounding portion, a bottom wall portion provided inside the grounding portion and recessed inward the container with respect to the grounding portion, and a pinch-off portion having a protrusion thread shape protruding from a bottom surface that faces downward the bottom wall portion, both longitudinal ends thereof each being continuous to the grounding portion; the bottom surface is a flat surface; and an innermost layer of the layers is a polyester resin layer.

The laminated container according to the present disclosure configured in the above described manner may preferably be provided with a polypropylene resin layer outside of the polyester resin layer via an adhesion layer.

In the laminated container according to the present disclosure configured in the above described manner, the layers may preferably include a light shielding layer.

In the laminated container according to the present disclosure configured in the above described manner, the pinch-off portion may preferably have a connecting portion being continuous to the bottom surface and a wide portion formed wider than the connecting portion and being continuous to a lower end of the connecting portion.

Advantageous Effect

According to the present disclosure, a laminated container is provided, in which a fused portion of a pinch-off portion can be prevented from being cracked due to an impact caused by dropping even if an innermost layer is a polyester resin layer.

DETAILED DESCRIPTION

A laminated container 1 according to an embodiment of the present disclosure will be described in more detail below with reference to FIGS. 1 to 4.

Figure 1:
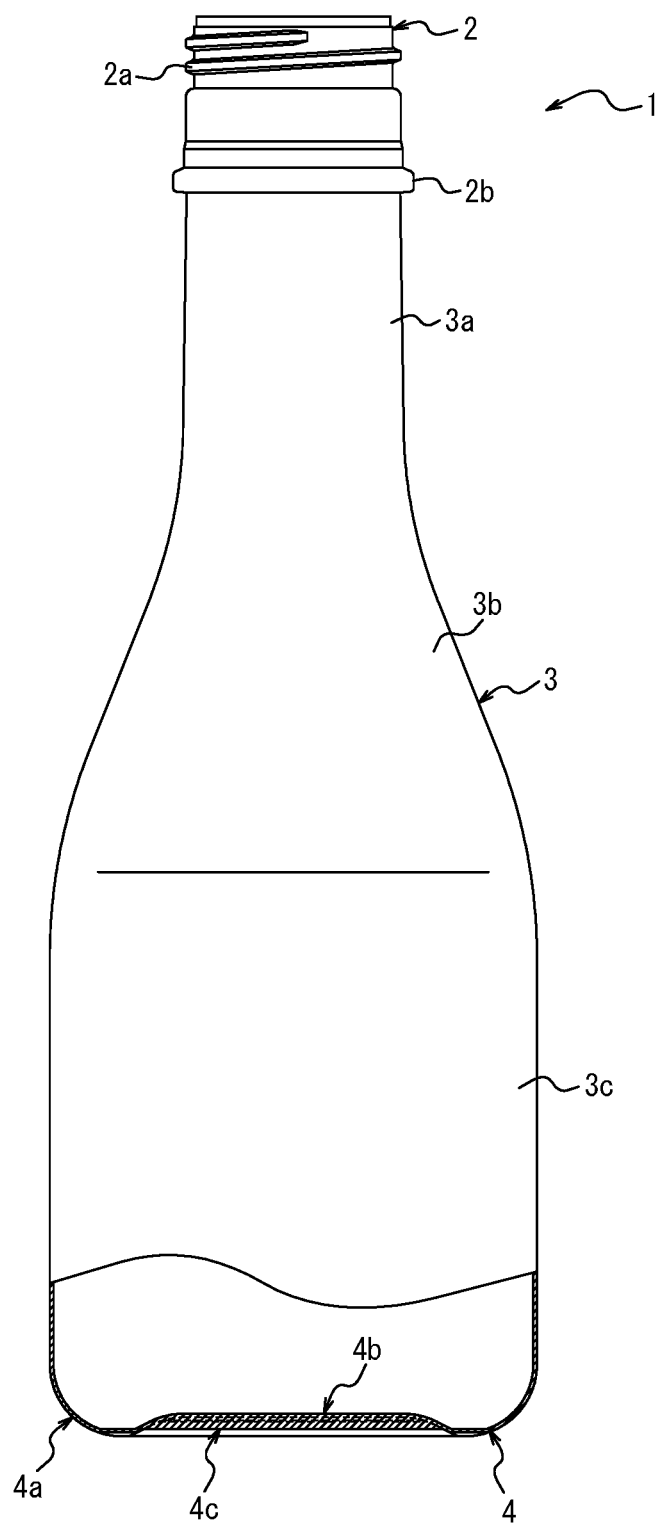
FIG. 1 is an elevation view of a laminated container according to an embodiment of the present disclosure, a part thereof being illustrated as a cutaway view.

In this specification and scope of claims, the up-down direction refers to upward and downward directions on the basis of the laminated container 1 in an erected state illustrated in FIG. 1.

The laminated container 1 is formed by extrusion blow molding into a synthetic resin container of a laminated structure having a plurality of layers. That is, the laminated container 1 is formed by Extrusion Blow Molding (EBM) into a synthetic resin container having a plurality of layers. In the Extrusion Blow Molding, a laminated parison formed into a cylindrical shape by co-extruding a plurality of layers each composed of a synthetic resin material is blow molded by using a horizontal split type split mold.

As described above, although the laminated container 1 has a plurality of layers, the innermost layer thereof is a polyester resin layer. An adhesion layer may be provided between the layers to adhere them to each other.

Although not illustrated in detail, in this embodiment, the laminated container 1 has a layer structure or a laminated structure laminated in order, from outside to inside of the container, of a polypropylene resin layer, an adhesion layer, an EVOH resin layer, an adhesion layer, a light shielding layer, an adhesion layer and a polyester resin layer.

As the above described adhesion layer, a modified polyolefin having adhesive property such as "Admer®" (Admer is a registered trademark in Japan, other countries, or both), for example, may be used.

The EVOH resin layer (ethylene-vinylalcohol copolymer resin layer) is provided as a barrier layer, and can reduce oxygen permeability of the laminated container 1 so as to prevent the contents contained in the laminated container 1 from being degraded or deteriorated due to oxidation. The content of ethylene, which is a copolymer content of the EVOH resin constituting the EVOH resin layer, may be changed in various manners according to the required barrier property. A barrier layer may be an MX nylon resin layer having an excellent oxygen barrier property.

As a light shielding layer, a polypropylene resin layer colored in black, for example, may be used. However, a layer made of other materials may be used as long as the layer can block out light. When a light shielding layer is provided, transmission of light into the laminated container 1 can be prevented. In this manner, the contents contained in the laminated container 1 can be prevented from being degraded or deteriorated by light.

As the polyester resin layer, polyethylene terephthalate resin, PET-G resin, PCTG resin, PCTA resin and the like can be used, and use of a copolyester resin layer is more preferable.

As illustrated in FIG. 1, the laminated container 1 is formed by the above described extrusion blow molding into a bottle shape including a mouth 2, a body 3 and a bottom 4.

The mouth 2 is formed into a substantially cylindrical shape, and on an outer periphery thereof is integrally provided with an external thread 2a configured to attach a cap (not illustrated) by thread connection. Further, the lower end of the mouth 2 is integrally provided with a neck ring 2b.

It is to be noted that the mouth 2 may be provided with an annular protrusion configured to attach a cap by capping, instead of threaded connection.

The body 3 is provided by being integrally continuous to the lower end of the mouth 2. Inside of the body 3 is a space capable of containing an alcohol beverage such as refined sake as contents.

In the case illustrated in FIG. 1, the body 3 is formed into a shape having: a neck portion 3a formed into a cylindrical shape with an outer diameter that is the same as that of the mouth 2 and being integrally continuous to the lower end of the mouth 2; a shoulder portion 3b being integrally continuous to the lower end of the neck portion 3a and having a gradually increasing outer diameter; and a main body portion 3c formed into a cylindrical shape with a diameter larger than that of the mouth 2 and being integrally continuous to the lower end of the shoulder portion 3b.

It is to be noted that the shape of the body 3 may be changed in various manners such as a shape without the neck portion 3a, for example.

The bottom 4 is provided integrally continuous to the lower end of the body 3, and blocks the lower end of the body 3. The bottom 4 has a grounding portion 4a, a bottom wall portion 4b and a pinch-off portion 4c. Although not illustrated in detail, the bottom 4 is also formed into a laminated structure having a plurality of layers as described above.

Figure 2:
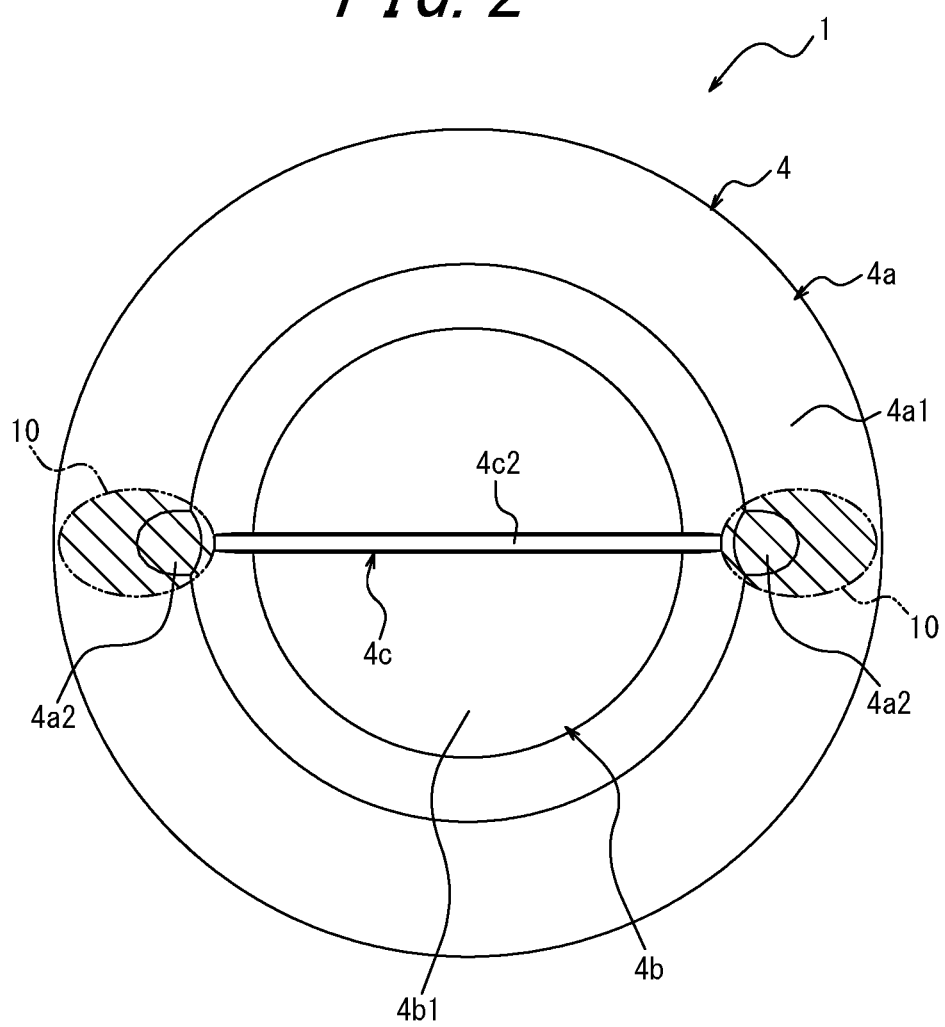
FIG. 2 is a bottom surface view of the laminated container illustrated in FIG. 1.
Figure 3:
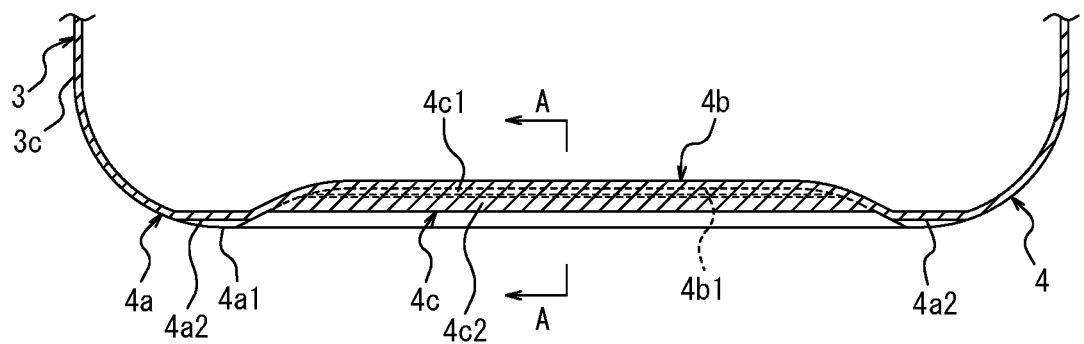
FIG. 3 is a cross-sectional view illustrating a bottom of the laminated container in FIG. 1 in an enlarged manner.

As illustrated in FIGS. 2 and 3, the grounding portion 4a is formed into an annular shape being integrally continuous to the lower end of the main body portion 3c of the body 3. Further, the diameter of the grounding portion 4a is gradually decreased downward in a curved shape from the portion connecting with the main body portion 3c of the body 3, and the lower end portion thereof is a grounding surface 4a1. The grounding surface 4a1 is a portion to be in contact with a support body when the laminated container 1 is placed, in an erected state, on the support body such as a table and the like.

The bottom wall portion 4b is provided inside the grounding portion 4a. In the case illustrated in FIG. 2, the bottom wall portion 4b is circular, and the outer perimeter edge thereof is integrally continuous to the inner perimeter edge of the grounding portion 4a. The bottom wall portion 4b has a substantially constant thickness, and the bottom surface 4b1 thereof facing downward is a flat surface perpendicular to the laminated container 1 in the axial direction (up-down direction). Further, the bottom wall portion 4b is recessed inward the container with respect to the grounding portion 4a such that the bottom surface 4b1 is displaced to the mouth 2 side (upper side) with respect to the grounding surface 4a1.

The pinch-off portion 4c is a portion formed into a protrusion thread shape protruding downward from the bottom surface 4b1 of the bottom wall portion 4b when a cylindrical laminated parison is pinched off by a split mold during extrusion blow molding. As illustrated in FIG. 2, the pinch-off portion 4c extends linearly on the bottom surface 4b1 so as to pass through the axial center of the bottom 4, and both ends thereof in the longitudinal direction are each integrally continuous to the grounding portion 4a. The protrusion height of the pinch-off portion 4c from the bottom surface 4b1 is within a range of a depth of the bottom surface 4b1 with respect to the grounding surface 4a1 (not protruding below the grounding surface 4a1), and with this height, the pinch-off portion 4c does not come in contact with the support table when the laminated container 1 is placed, in an erected state, on the support table.

A recess 4a 2 provided in a recessed manner with respect to the grounding surface 4a1 is provided at each extension of the pinch-off portion 4c of the grounding portion 4a.

In the laminated container 1 according to this embodiment, the bottom surface 4b1 of the bottom wall portion 4b where the pinch-off portion 4c has a flat surface, and both ends of the pinch-off portion 4c in the longitudinal direction are each continuous to the grounding portion 4a. Thus, when the bottom 4 is formed by extrusion blow molding, a thick portion that is thicker than the other portion can be produced in each area around the extension of the pinch-off portion 4c of the grounding portion 4a (areas indicated by a reference sign 10 in FIG. 2). Thus the strength of the grounding portion 4a is increased in each area 10 around each extension of the pinch-off portion 4c, which enables, when an impact caused by dropping or the like is applied to the laminated container 1, the impact to be difficult to be transmitted to the pinch-off portion 4c via the grounding portion 4a. In this manner, even if the innermost layer is a polyester resin layer, the fused portion of the pinch-off portion 4c can be prevented from being cracked due to an impact caused by dropping.

Drop test is performed on the laminated container 1 according to this embodiment. In the drop test, the laminated container 1 was dropped laterally and longitudinally from a height of 1 m under conditions of atmospheric temperature 5° C. and N=5. After the tests, no crack was found with the fused portion of the pinch-off portion 4c of the laminated container 1.

On the other hand, although not illustrated in detail, in a comparative example of the laminated container whose bottom surface of the bottom wall portion on which a pinch-off portion is formed is recessed upward so as to form a domed shape, both ends of the pinch-off portion in the longitudinal direction are each separated from the grounding portion, which causes a thick portion between the grounding portion and each end of the pinch-off portion in the longitudinal direction. Thus the strength of the grounding portion cannot be increased, and the fused portion of the pinch-off portion cannot be prevented from being cracked due to an impact caused by dropping and the like. With respect to the laminated container according to the comparative example, after a longitudinal drop test and a horizontal drop test each performed under conditions of atmospheric temperature 5° C., a height 1 m and N=5, crack was found with the fused portion of the pinch-off portion of the laminated container after the first longitudinal drop test. Compared with the container having a domed shaped bottom surface, a flat pinch-off shape according to the present disclosure can decrease an impact on the pinch-off portion when released from a mold, thus is particularly effective when a polyester resin is used for an innermost layer that is difficult to be fused.

Figure 4:
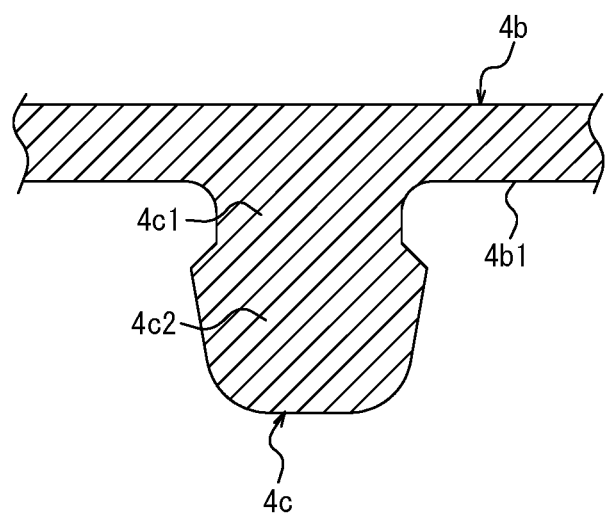
FIG. 4 is a cross-sectional view along A-A line in FIG. 3.

As illustrated in FIG. 4, in the laminated container 1 according to this embodiment, the pinch-off portion 4c has a connecting portion 4c1 being continuous to the bottom surface 4b1 and a wide portion 4c2 having a width larger than that of the connecting portion 4c1 and being integrally continuous to the lower end of the connecting portion 4c1. That is, a thicker portion is provided on the lower end side of the pinch-off portion 4c.

As described above, since the pinch-off portion 4c has the connecting portion 4c1 and the wide portion 4c2, the fusing strength of the pinch-off portion 4c itself can be enhanced. Thus, when the innermost layer is composed of a polyester resin layer, crack of the fused portion of the pinch-off portion 4c due to drop and the like can be further securely prevented.

In the laminated container 1 according to this embodiment, since the bottom surface 4b1 is a flat surface, the bottom wall portion 4b having a uniform thickness can be obtained. Thus, when a plurality of layers include a light shielding layer, a thickness of the light shielding layer at the bottom 4 is prevented from being partially too thin, and light shielding effect can be ensured at the bottom 4.

On the other hand, in a comparative example of the laminated container whose bottom surface of the bottom wall portion on which a pinch-off portion is formed is recessed upward so as to form a domed shape, uniform thickness of the bottom wall portion cannot be obtained, and the thickness of the bottom wall portion is thin around the pinch-off portion. Thus, when a plurality of layers include a light shielding layer, the light shielding layer is too thin around the pinch-off portion, and the light-blocking effect cannot be secured at the portion.

Needless to say, the present disclosure is not limited to the above described embodiment, and various changes may be made without departing from the scope of the present disclosure.

For example, in the above described embodiment, although the laminated container 1 has a layer structure or a laminated structure laminated in order, from outside to inside of the container, of a polypropylene resin layer, an adhesion layer, an EVOH resin layer, an adhesion layer, a light shielding layer, an adhesion layer and a polyester resin layer, it is not limited thereto, and a layer structure can be changed in various manners as long as the laminated container 1 has a plurality of layers and the innermost layer of the layers is a polyester resin layer.

Further, in the above described embodiment, although the laminated container 1 includes a light shielding layer, it may not include a light shielding layer.

Moreover, in the above described embodiment, although the pinch-off portion 4c has the connecting portion 4c1 being continuous to the bottom surface 4b1 and the wide portion 4c2 having a width larger than that of the connecting portion 4c1 and being integrally continuous to the lower end of the connecting portion 4c1, it is not limited thereto, and the shape of the pinch-off portion 4c may be changed in various manners as long as it is formed into a protrusion thread shape protruding from the bottom surface 4b1 and the both ends in the longitudinal direction are each continuous to the grounding portion 4a.

REFERENCE SIGNS LIST

1 Laminated container
2 Mouth
2a External thread
2b Neck ring
3 Body
3a Neck portion
3b Shoulder portion
3c Main body portion
4 Bottom
4a Grounding portion
4a1 Grounding surface
4a2 Recess
4b Bottom wall portion
4b1 Bottom surface
4c Pinch-off portion
4c1 Connecting portion
4c2 Wide portion
10 Area

The invention claimed is:

1. A synthetic resin laminated container formed by extrusion blow molding into a bottle shape having a plurality of layers and comprising a mouth, a body and a bottom, wherein:
the bottom has a grounding portion, a bottom wall portion provided inside the grounding portion and recessed inward the container with respect to the grounding portion, and a pinch-off portion protruding from a bottom surface that faces downward the bottom wall portion, and both ends of the pinch-off portion in a longitudinal direction are each continuous to the grounding portion;
the bottom surface is a flat surface;
an innermost layer of the layers is a polyester resin layer;
the grounding portion has an annular shaped grounding surface configured to be in contact with a support body when the laminated container is placed, in an erected state, on the support body; and
at each of the ends of the pinch-off portion, the grounding surface has a thick portion that is thicker than other portions of the grounding surface.

2. The laminated container according to claim 1, wherein outside of the polyester resin layer is provided with a polypropylene resin layer via an adhesion layer.

3. The laminated container according to claim 1, wherein the layers include a light shielding layer.

4. The laminated container according to claim 1, wherein the pinch-off portion has a connecting portion being continuous to the bottom surface and a wide portion formed wider than the connecting portion and is continuous to a lower end of the connecting portion.

5. The laminated container according to claim 2, wherein the layers include a light shielding layer.

6. The laminated container according to claim 2, wherein the pinch-off portion has a connecting portion being continuous to the bottom surface and a wide portion formed wider than the connecting portion and is continuous to a lower end of the connecting portion.

7. The laminated container according to claim 3, wherein the pinch-off portion has a connecting portion being continuous to the bottom surface and a wide portion formed wider than the connecting portion and is continuous to a lower end of the connecting portion.

8. The laminated container according to claim 5, wherein the pinch-off portion has a connecting portion being continuous to the bottom surface and a wide portion formed wider than the connecting portion and is continuous to a lower end of the connecting portion.

* * * * *